US012154747B2

(12) United States Patent
Moon et al.

(10) Patent No.: US 12,154,747 B2
(45) Date of Patent: Nov. 26, 2024

(54) ARC EXTINGUISHING DEVICE OF DC CIRCUIT BREAKER

(71) Applicant: O-SUNG ELECTRIC MACHINERY CO., LTD., Paju-si (KR)

(72) Inventors: Sunghwan Moon, Seoul (KR); Heebong Moon, Seoul (KR)

( * ) Notice: Subject to any disclaimer, the term of this patent is extended or adjusted under 35 U.S.C. 154(b) by 177 days.

(21) Appl. No.: 17/852,402

(22) Filed: Jun. 29, 2022

(65) Prior Publication Data

US 2023/0317384 A1 Oct. 5, 2023

(30) Foreign Application Priority Data

Mar. 30, 2022 (KR) ........................ 10-2022-0039626

(51) Int. Cl.
*H01H 9/44* (2006.01)

(52) U.S. Cl.
CPC .................................... *H01H 9/446* (2013.01)

(58) Field of Classification Search
CPC .......... H01H 9/446; H01H 9/44; H01H 9/345; H01H 9/346; H01H 9/362; H01H 9/36; H01H 9/443; H01H 9/46; H01H 2009/365; H01H 73/18; H01H 73/38; H01H 71/38; H01H 71/24
USPC .. 218/22, 23, 24, 26, 28, 30, 31, 34–36, 38, 218/40
See application file for complete search history.

(56) References Cited

U.S. PATENT DOCUMENTS 7,105,764 B2 * 9/2006 Rakus ...................... H01H 9/46 335/201
8,502,102 B2 * 8/2013 Eriksson .............. H01H 33/182 218/150
8,866,034 B2 * 10/2014 Fasano ................... H01H 9/446 218/156
9,153,399 B2 * 10/2015 Afshari .................. H01H 33/08
9,324,519 B2 * 4/2016 Karlen ................... H01H 9/362
9,431,197 B2 * 8/2016 Engewald ............ H01H 33/182
9,673,004 B1 * 6/2017 Ruempler ................ H01H 9/36
(Continued)

FOREIGN PATENT DOCUMENTS

JP 2016-035807 A 3/2016
JP 2021-190196 A 12/2021
(Continued)

OTHER PUBLICATIONS

Translation of JP2016035807 (Original document published Mar. 17, 2016) (Year: 2016).*

*Primary Examiner* — William A Bolton

(57) ABSTRACT

An arc extinguishing device of a DC circuit breaker is proposed. The arc extinguishing device is provided with electromagnets installed on opposite sides of an arc extinguishing chamber, so as to increase arc resistance, thereby quickly extinguishing an arc. The arc extinguishing device includes: an arc extinguishing chamber installed above contact terminals and provided with an internal space formed open up and down; a plurality of grids installed side by side in the internal space of the arc extinguishing chamber; a cover installed on an upper part of the arc extinguishing chamber, and including a filter for filtering out impurities remaining in an arc which is extinguished in the arc extinguishing chamber; and electromagnets installed on the one side and the other side of the internal space of the arc extinguishing chamber.

2 Claims, 4 Drawing Sheets

(56) References Cited

U.S. PATENT DOCUMENTS

| | | | | |
|---|---|---|---|---|
| 10,665,403 | B2 * | 5/2020 | Rival | H01H 33/74 |
| 10,957,504 | B1 * | 3/2021 | Shea | H01H 9/443 |
| 2012/0261382 | A1 | 10/2012 | Fasano | |
| 2014/0061160 | A1 * | 3/2014 | Juds | H01H 9/443<br>218/26 |
| 2014/0319099 | A1 * | 10/2014 | Baujan | H01H 33/08<br>218/41 |

FOREIGN PATENT DOCUMENTS

| | | | |
|---|---|---|---|
| KR | 10-2009-0020395 | A | 2/2009 |
| KR | 10-1568585 | B1 | 11/2015 |
| KR | 10-2018-0041781 | A | 4/2018 |

* cited by examiner

ARC EXTINGUISHING DEVICE OF DC CIRCUIT BREAKER

CROSS REFERENCE TO RELATED APPLICATION

The present application claims priority to Korean Patent Application No. 10-2022-0039626, filed Mar. 30, 2022, the entire contents of which is incorporated herein for all purposes by this reference.

BACKGROUND OF THE INVENTION

Field of the Invention

The present disclosure relates to an arc extinguishing device of a DC circuit breaker and, more particularly, to an arc extinguishing device of a DC circuit breaker, wherein the arc extinguishing device is provided with electromagnets installed on opposite sides of an arc extinguishing chamber, so as to increase an arc extinguishing length and increase arc resistance, whereby arc extinguishing may be conducted quickly.

Description of the Related Art

Recently, interest in DC power distribution systems is growing due to demand arising for DC loads such as new and renewable energy, data centers, and electric vehicles. In particular, as business in the new and renewable energy field are increasing, the demand for a direct current type air circuit breaker (DC ACB) required for photovoltaic power generation/operation facilities and energy storage systems (ESS) is also increasing. The roles of DC circuit breakers have become important in order to secure the power quality improvement and the safety against fire through high reliability of a DC distribution system.

Since a direct current (DC) circuit breaker should control a direct current that does not have current zero, unlike an alternating current (AC) circuit breaker, it is very important to induce a high arc voltage to generate the current zero in a process of breaking short circuit and overcurrent. In addition, since a direct current (DC) system does not have the current zero, even when a contact of a circuit breaker is opened, a fault current continues to flow due to the occurrence of an electric arc caused by a circuit inductor component, whereby internal burnout or explosion of the circuit breaker may occur in a case where the current is not cut off quickly. An arc is a flow of high-temperature and high-pressure electrons, and when the generated arc remains in an internal space of a circuit breaker for a long time, there is a risk of damage to each component of the circuit breaker. In addition, when an arc is discharged to the outside of the circuit breaker without a separate treatment process, there is a risk that a user may be injured.

In order to solve such problems, technology that applies an arc extinguishing device to a DC circuit breaker is disclosed through Korean Patent No. 10-1568585, as the related art. In the related art, at least a pair of magnets are arranged with a switch interposed therebetween, so as to increase resistance to an arc current, thereby breaking the arc current. However, since the DC circuit breaker disclosed in the related art generates an arc current due to a high current, a volume of each magnet should be increased in order to increase the resistance to the arc current and also there is a limit to increasing the magnitude of the resistance, and thus there is a problem that the rate of breaking the arc current is slow. Recently, the International Electrotechnical Commission (IEC) standard requires not only fault current breaking but also switching performance in a small current area for DC ACB products installed in the field in consideration of an actual operation environment of photovoltaic facilities. Unlike the process of breaking short circuit and overcurrent, the immobility time of an arc that occurs when a contact is opened may be prolonged in a process of breaking a small current of a DC system, and accordingly, deterioration of product performance may occur when burnout inside a product is accelerated.

Documents of Related Art

SUMMARY OF THE INVENTION

The present disclosure has been devised to solve the above problems, and an objective of the present disclosure is to provide an arc extinguishing device of a DC circuit breaker, wherein the arc extinguishing device is provided with electromagnets installed on opposite sides of an arc extinguishing chamber, so as to increase arc resistance without increasing a volume of the arc extinguishing device and to increase suction force, thereby increasing arc extinguishing efficiency of a small current.

In order to achieve the above-described objective, an embodiment of the present disclosure provides an arc extinguishing device of a DC circuit breaker, the device including: an arc extinguishing chamber installed above contact terminals and provided with an internal space formed open up and down; a plurality of grids installed from one side to the other side of the internal space of the arc extinguishing chamber; a cover installed on an upper part of the arc extinguishing chamber, and including a filter for filtering out impurities remaining in an arc which is extinguished in the arc extinguishing chamber; and electromagnets installed on the one side and the other side of the internal space of the arc extinguishing chamber.

In this case, it is preferable that the electromagnets may be positioned at upper ends of opposite sides of the arc extinguishing chamber, and may be provided with suction rods installed thereon, the suction rods extending so as to transmit an electromagnetic force to lower ends of the arc extinguishing chamber.

In addition, it is preferable that the electromagnet on the one side of the arc extinguishing chamber may be installed so as to correspond to the contact terminal positioned in a downward direction.

In addition, it is preferable that slide grooves may be formed in an inner surface of the arc extinguishing chamber to which the grids are slidable to be coupled from the upward direction.

In addition, it is preferable that a bottom of each grid may form a round side that is curved upwards, and a guide groove for guiding the arc to an attraction direction may be formed at a top of the round side.

The arc extinguishing device of the DC circuit breaker according to the present disclosure has the following effects.

First, the embodiment of the present disclosure is installed above contact terminals, so that a gaseous arc generated when the contact terminal is opened may be effectively induced into the interior of the arc extinguishing chamber.

Second, since the embodiment of the present disclosure may generate a magnetic field through the electromagnets, there is no need to increase the size of the magnets in order to increase the arc suction force. Accordingly, the embodiment of the present disclosure has an effect of simplifying a configuration thereof.

Third, the present disclosure has an effect of making a direction of current of the circuit breaker unaffected through an electromagnetic force as the electromagnets are configured to generate the electromagnetic force inside the arc extinguishing chamber.

Fourth, the present disclosure has an effect that a suction rod extending from each electromagnet toward a lower end of the arc extinguishing chamber is installed, so as to extend the range of generating the electromagnetic force of the electromagnets to the lower end of the arc extinguishing chamber, thereby increasing the arc suction efficiency.

Fifth, the present disclosure has an effect that the electromagnets are installed on opposite sides of the grids, so that the length of an arc is increased along an electromagnetic force generated by an electromagnet of one side of the grids to a position where an electromagnetic force is generated by an electromagnet of the other side of the grids, thereby quickly extinguishing the arc as the arc resistance increases while passing through the grids.

DETAILED DESCRIPTION OF THE INVENTION

The terms or words used in this description and claims are not construed as being limited to their ordinary or dictionary meanings, and should be interpreted as meanings and concepts corresponding to the technical spirit of the present disclosure based on the principle that inventors may properly define the concept of a term in order to best describe their disclosure.

Hereinafter, an arc extinguishing device of a DC circuit breaker according to a preferred exemplary embodiment of the present disclosure will be described with reference to the accompanying FIGS. 1 to 5.

The arc extinguishing device of the DC circuit breaker is installed above contact terminals, so that arc attraction for arc extinguishing may be conducted effectively. In addition, an arc is extended from an electromagnet on one side to an electromagnet on the other side of the arc extinguishing device through the electromagnetic force of the electromagnets, so that even when a small current (i.e. low voltage) is broken, the arc does not remain on a contact terminal side but is attracted to grids positioned in an upward direction, whereby the arc is extinguished quickly.

Figure 1:
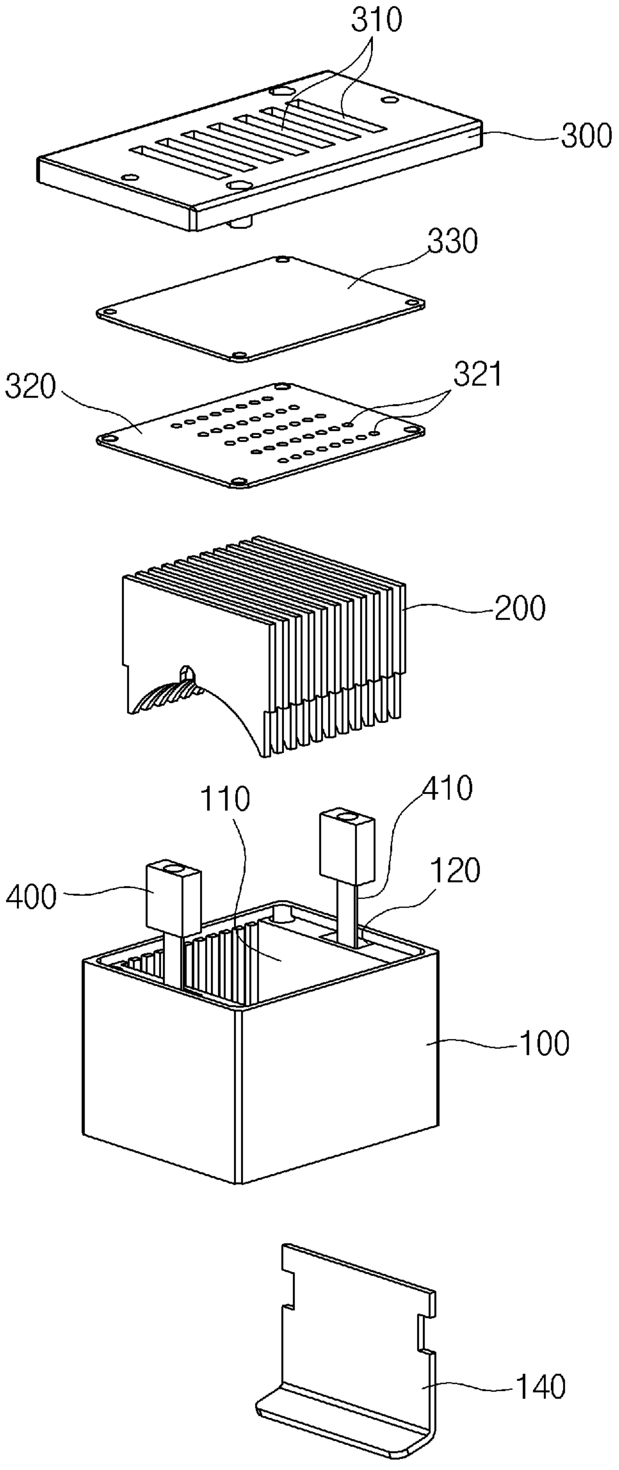
FIG. 1 is an exploded perspective view illustrating an arc extinguishing device of a DC circuit breaker according to a preferred exemplary embodiment of the present disclosure.

As shown in FIG. 1, the arc extinguishing device of the DC circuit breaker includes an arc extinguishing chamber 100, grids 200, a cover 300, and electromagnets 400.

Figure 2:
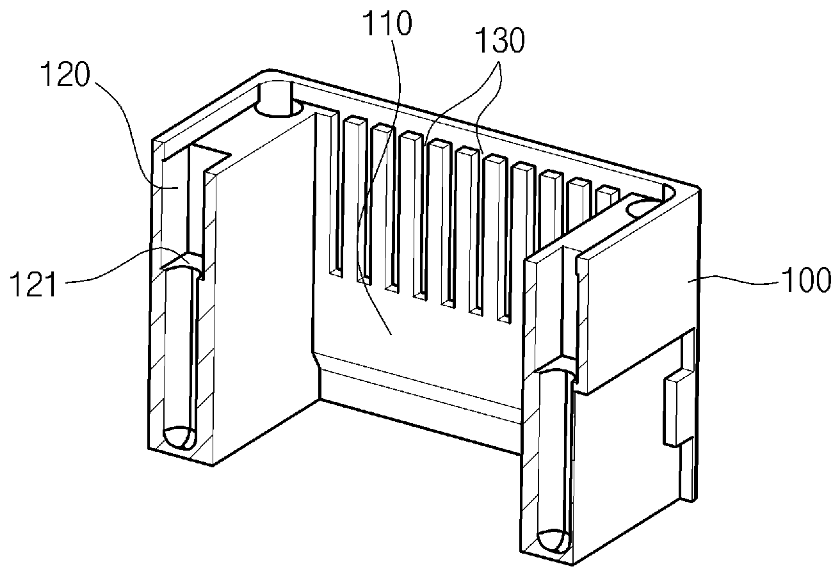
FIG. 2 is a cross-sectional perspective view illustrating an arc extinguishing chamber of the arc extinguishing device of the DC circuit breaker according to the preferred exemplary embodiment of the present disclosure.
Figure 4:
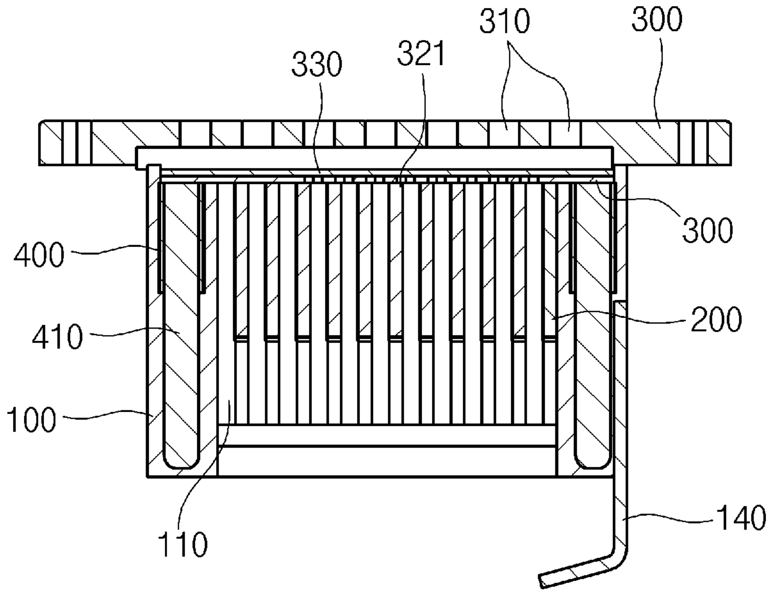
FIG. 4 is a cross-sectional view illustrating the arc extinguishing device of the DC circuit breaker according to the preferred exemplary embodiment of the present disclosure.
Figure 5:
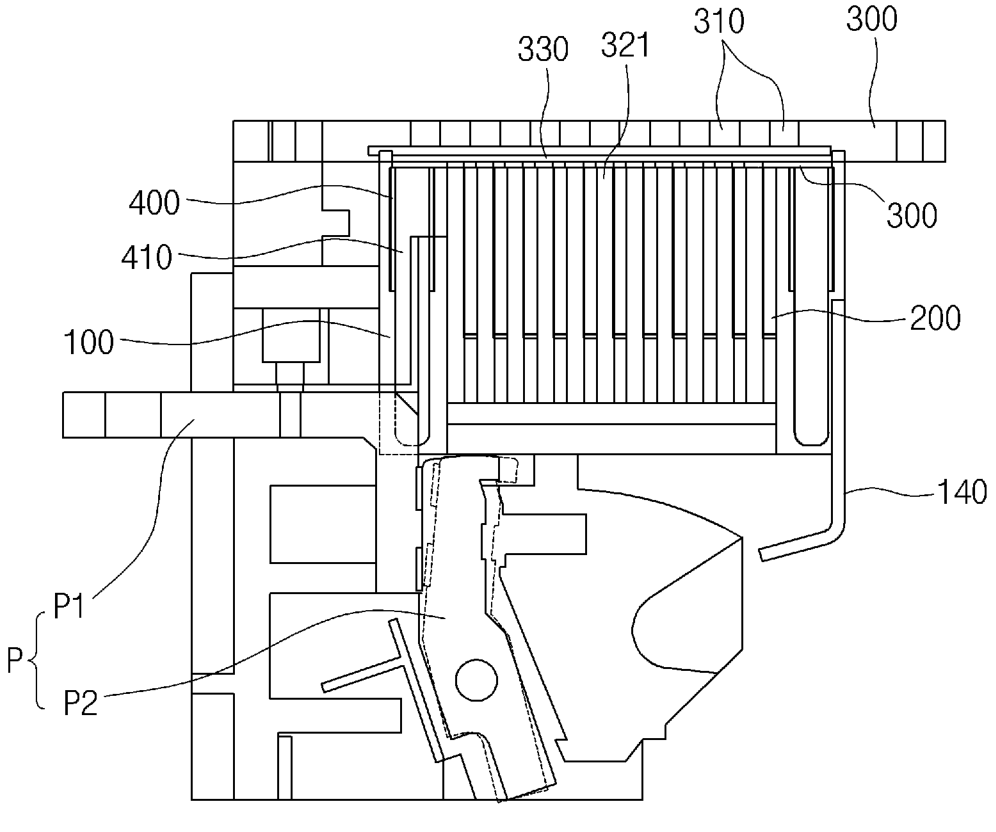
FIG. 5 is a cross-sectional view illustrating a main part in a state in which the arc extinguishing device of the DC circuit breaker according to the preferred exemplary embodiment of the present disclosure is installed in the DC circuit breaker.

The arc extinguishing chamber 100 forms an internal space 110 in which an arc generated from a contact terminal P is extinguished, and each component for extinguishing the arc is installed in the internal space 110. In addition, the internal space 110 of the arc extinguishing chamber 100 is opened in upward and downward directions, and is installed above the contact terminals P as shown in FIG. 5. Since the arc extinguishing chamber 100 is installed at the position in the upward direction of the contact terminal P, a gaseous arc may be smoothly introduced into the internal space 110 of the arc extinguishing chamber 100. The arc extinguishing chamber 100 preferably has a form of a rectangle, and as shown in FIG. 2, installation grooves 120 for installing electromagnets are formed in one side and the other side of the internal space 110 in a longitudinal direction of the arc extinguishing chamber 100. Each installation groove 120 forms a step 121 formed to be stepped in a vertical direction. In addition, a plurality of slide grooves 130 is formed in the internal space 110 of the arc extinguishing chamber 100 toward one side and the other side of the arc extinguishing chamber 100. The slide groove 130 is configured for insertion and installation of the grid 200 to be described later. In addition, as shown in FIGS. 1 and 4, a runner 140 is preferably installed on the other side of the arc extinguishing chamber 100.

Figure 3:
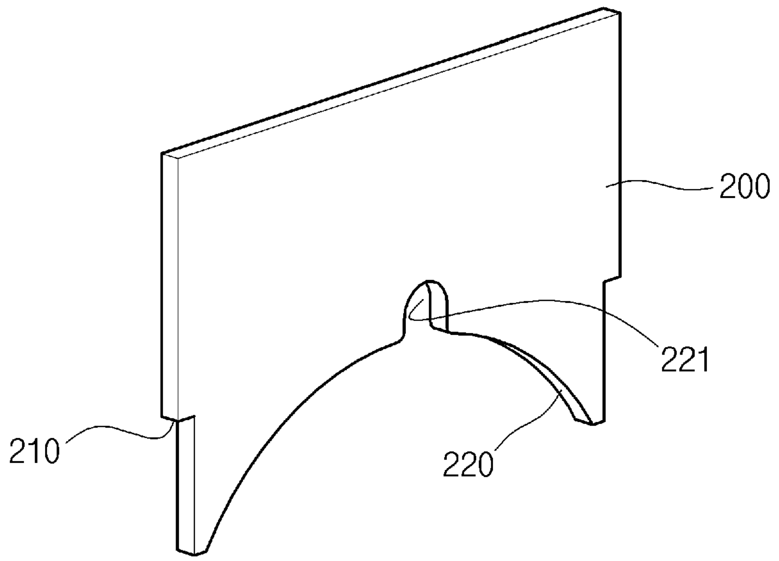
FIG. 3 is a perspective view illustrating a grid of the arc extinguishing device of the DC circuit breaker according to the preferred exemplary embodiment of the present disclosure.

The grid 200 serves to extinguish an arc by increasing and cooling an arc voltage. As shown in FIG. 1, a plurality of grids 200 is provided, and each grid 200 is provided in a form of a plate. In this case, the grid 200 is preferably provided with a conductive metal so that the electromagnetic force may be effectively applied to the arc. As shown in FIG. 3, the grid 200 is provided with the steps 210 formed on opposite sides thereof, so as to be slidable to be coupled to a slide groove 130 of the arc extinguishing chamber 100. In addition, the bottom of the grid 200 is provided with a round side 220 formed to be rounded upwards. As the round side 220 is formed on the grid 200, an extinguishing space of the arc extinguishing chamber 100 may be effectively secured, and also a path through which an arc is attracted from one side to the other side of the arc extinguishing chamber 100 may be effectively secured. In particular, as a guide groove 221 in a shape of a recess is further formed in the center of the round side 220, an arc may more effectively extend along the plurality of grids 200, so the arc extinguishing action through each grid 200 may be effectively conducted.

The cover 300 shields an open upper part of the arc extinguishing chamber 100, and serves to exhaust gas generated while an arc is extinguished in the arc extinguishing chamber 100 to the outside. The cover 300 is provided with a plurality of gas outlets 310 formed therein, and includes an insulating plate 320 and a filter 330. That is, as shown in FIG. 1, the filter 330 and the insulating plate 320 are sequentially arranged in a downward direction of the cover 300. The filter 330 filters out impurities contained in the gas generated during the arc extinguishing, and a plurality of exhaust holes 321 is formed in the insulating plate 320. The cover 300 having the above configuration is provided as a means for increasing pressure inside the arc extinguishing chamber 100. Specifically, the cover 300 may cover an opening of the internal space 110 to instantaneously increase the pressure of the internal space 110 when metal gas is generated through the occurrence of an arc, so that the metal gas may be effectively discharged through the gas outlets 310 of the cover 300 due to a temporary pressure difference between the pressure inside the arc extinguishing chamber 100 and the pressure outside the circuit breaker.

The electromagnets 400 induce an arc generated from the contact terminal P into the internal space 110 of the arc extinguishing chamber 100 so that arc extinguishing may be conducted quickly, and as shown in FIGS. 1 and 5, the electromagnets 400 are installed on opposite sides of the internal space 110. As may be seen from the name of electromagnet, an electromagnet 400 forms an electromagnetic field by using an electric current, thereby effectively suctioning an arc existing in the downward direction of the arc extinguishing chamber 100 into the internal space 110 in the upward direction. The electromagnets 400 may generate the suction force through the electromagnetic field regardless of the direction of the electric current of the circuit breaker, and are installed in the installation grooves 120 on one side and the other side of the arc extinguishing chamber 100. In this case, the electromagnet 400 on one side of the arc extinguishing chamber 100 corresponds to the contact terminal P as shown in FIG. 5, and an arc generated at the contact terminal P may be attracted through the electromagnetic field generated by the electromagnet 400 on the one side, and then may extend to the electromagnet 400 on the other side along the grids 200. Meanwhile, the electromagnet 400 is hung on the step 121 of the installation groove 120, and is made in a form of a rectangular parallelepiped. In addition, the electromagnet 400 includes a suction rod 410 extending downward. The suction rod 410 has a configuration for extending the range of the electromagnetic force toward the contact terminal P side, and is provided in a form of a cylinder extending downward from the electromagnet 400. In this way, as the suction rod 410 is installed in the electromagnet 400, the electromagnetic field generated by the electromagnet 400 may be generated in proximity to the contact terminal P through the suction rod 410, so that the arc may be effectively suctioned into the internal space 110 of the arc extinguishing chamber 100. In particular, in the case of a small current, when the contact terminal P is opened, an arc may not remain at the contact terminal P, but may be effectively guided to the internal space 110 by the suction rod 410, so that the arc extinguishing may be effectively conducted.

Hereinafter, a process of extinguishing an arc through the arc extinguishing device of the DC circuit breaker configured as described above will be described.

An overcurrent is generated, and a contact terminal P is opened by the overcurrent. That is, as shown in FIG. 5, a movable terminal P2 is separated from a fixed terminal P1. In this case, an arc is generated from the contact terminal P, and the arc is attracted through a suction rod 410 of electromagnet 400 on one side where an electromagnetic field is generated, and is suctioned into an internal space 110 of an arc extinguishing chamber 100. Thereafter, the arc is extended toward an electromagnet 400 on the other side through each grid 200, and in this process, the arc is extended along a round side 220 and a guide groove 221 of each grid 200. In this way, while extending, as the arc contacts a plurality of grids 200, arc extinguishing may be effectively conducted. That is, a length of the arc is extended by the magnetic field of the electromagnet 400 and arc resistance is increased, so that the arc extinguishing may be conducted quickly.

As previously described, the arc extinguishing device of the DC circuit breaker according to the present disclosure is provided with the electromagnets 400 installed on the opposite sides of the arc extinguishing chamber 100, so as to increase the arc length and increase the arc resistance through the generation of the electromagnetic field of the electromagnets 400, thereby quickly extinguishing the arc. In addition, in the present disclosure, by installing the arc extinguishing chamber 100 at a position in the upward direction of the contact terminal P, the arc having gaseous nature may be effectively attracted in the arc extinguishing chamber, thereby increasing the arc extinguishing efficiency.

Meanwhile, although the present disclosure has been described in detail only with respect to the above-described specific examples, it is apparent to those skilled in the art that various changes and modifications are possible within the scope of the technical spirit of the present disclosure, and it is natural that such variations and modifications belong to the appended claims.

What is claimed is:

1. An arc extinguishing device for extinguishing arc generated from contact terminals of a DC circuit breaker, the device comprising:

an arc extinguishing chamber to be installed above the contact terminals, having an internal space formed open up and down and installation grooves formed on opposing two sides of the internal space, the installation grooves comprising steps formed therein;

a plurality of grids installed side by side in the internal space of the arc extinguishing chamber;

a cover provided with a plurality of gas outlets to cover an upper part of the arc extinguishing chamber, the cover further comprising an insulating plate having a plurality of exhaust holes and a filter for filtering out impurities remaining in the arc extinguishing chamber; and a pair of electromagnets positioned in the installation grooves respectively so as to correspond to the contact terminals positioned therebelow, each electromagnet being hung on each of the steps, wherein slide grooves are formed in an inner surface of the arc extinguishing chamber to which the grids are slidable to be coupled from above, and wherein a bottom of each grid having a round side curved upwards, and a guide groove for guiding the arc is formed at a top portion of the round side.

2. The arc extinguishing device of claim 1, wherein each electromagnet comprises a suction rod extending downward below each step toward each of the contact terminals.

* * * * *